ENCASED MAGNETIC CORE

Filed Oct. 16, 1958

INVENTOR
Samuel Bryan
BY Connolly and Hutz
ATTORNEYS

3,042,841
ENCASED MAGNETIC CORE

Samuel Bryan, Silver Spring, Md., assignor, by mesne assignments, to Sprague Electric Company, a corporation of Massachusetts Filed Oct. 16, 1958, Ser. No. 767,727
4 Claims. (Cl. 317—158)

This invention relates to an encased tape-wound magnetic core, and more particularly relates to the relatively smaller size of tape-wound magnetic core which is referred to as a bobbin magnetic core.

Since tape-wound magnetic cores, and particularly the smaller bobbin type cores, incorporate windings of extremely thin magnetic material, they are inclined to be highly strain-sensitive; and they accordingly must be protected from physical forces if they are to maintain dependable electro-magnetic operational characteristics. Heretofore, bobbin cores have been formed by winding thin and ultra thin magnetic tape of a thickness in the neighborhood of 1/1000 of an inch and less about ceramic spools which are circumferentially wrapped with a pressure-sensitive plastic tape which bridges the slot in the spool containing the tape and seals the tape between the flanges of the bobbin. One type of this pressure-sensitive tape which has been widely used is tape formed of a Mylar (trademark of the Du Pont Corp.) composition which is highly satisfactory in most respects. However, this Mylar tape and other pressure-sensitive tapes which have been used to seal bobbins have a tendency to fall in between the flanges of the bobbin and contact the magnetic tape wound between them. Even the slightest contact with the magnetic winding is enough to adversely affect the operational characteristics of the core. This has caused a high rate of rejection of these cores during manufacture and has accentuated their highly strain-sensitive characteristics.

An object of this invention is to provide an encased tape-wound magnetic core which is strong, rigid, durable and shock-absorbent, and which is also simple and economical to manufacture and assemble.

In accordance with this invention, an extremely strong, durable, rigid and shock-absorbent encased magnetic core is made by inserting a wound bobbin with a force fit within a sleeve, having an outer layer of substantially hard material, and an inner layer of relatively compressible material. The resiliency of the inner layer permits press fitting with substantial interference between mating parts regardless of variations in diameter of the bobbins which may vary over a wide range, and the hard outer layer protects the assembly against applied stresses. Furthermore, this compressible inner layer helps make the resultant assembly surprisingly shock-absorbent.

Novel features and advantages of the present invention will become apparent to one skilled in the art from a reading of the following description in conjunction with the accompanying drawings wherein similar reference characters refer to similar parts and in which.

Figure 1:
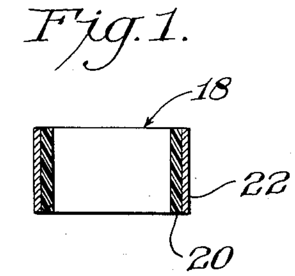
FIG. 1 is a cross-sectional view in elevation of one embodiment of this invention.
Figure 2:
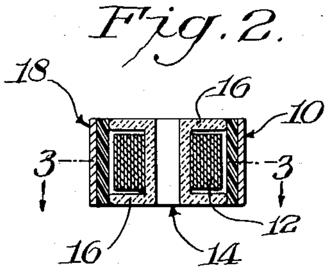
FIG. 2 is a cross-sectional view in elevation of a portion of the embodiment shown in FIG. 1.
Figure 3:
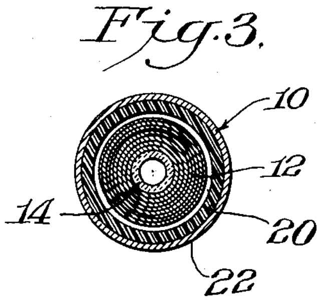
FIG. 3 is a cross-sectional view taken through FIG. 1 along the line 3—3.

In FIGS. 1 and 3 is shown an encased tape-wound magnetic core 10 which includes a winding of magnetic tape 12 applied upon a bobbin 14, for example, of the ceramic type. Type 12 is, for example, magnetic steel tape approximately 1/1000 of an inch thick which is wound between flanges 16 of bobbin 14 and secured, for example, by spot welding to itself (not shown). Bobbin 14 is inserted within a sleeve 18 which is individually shown in FIG. 2. Sleeve 18 includes an inner layer 20 of relatively compressible material, made for example, of vulcanized fiber and an outer layer 22 of a relatively hard and durable material, for example, tough paper impregnated with a phenolic resin. Sleeves formed in this manner can surprisingly stand as much as a 10 mil expansion without breaking. It is, therefore, possible to consistently insert wound bobbins 14 within these sleeves with a firm interference fit which permanently unites them even though the bobbins are themselves manufactured to a tolerance which may vary between + or −0.005 inch.

A specific example of sleeve 18 for a bobbin, for example, having an outside flange diameter of 0.375 inch, has a nominal inside diameter within the inner layer of compressible material of 0.369 inch and varies from +0.000 inch to −0.005 inch. The thickness of compressible inner layer 20 is, for example, approximately 0.008 inch, and the thickness of the outer plastic impregnated layer 22 is approximately 0.003 inch. When sleeves formed according to the aforementioned dimensions are assembled over bobbins of the aforementioned outside diameter which themselves may vary from +0.005 inch to −0.005 inch, a permanent interference fit is consistently provided.

Encased magnetic cores formed in this manner are consistently assembled into a permanent rigid assembly which is amazingly resistant to imposed mechanical stresses or shocks. When they are assembled, as described, by a pressing apparatus, for example an arbor press, the final assembly is surprisingly permanently united and rigid throughout its entire useful life. Furthermore, the inner layer of compressible material helps absorb or cushion shocks transmitted to the cores which shields them from damaging applied shocks as well as facilitating permanent assembly of the cores within the sleeve.

What is claimed is:

1. An encased magnetic bobbin core comprising a spool of insulating material having flanges of a relatively small diameter in the order of a fraction of an inch, elongated strain-sensitive magnetic material wound in a substantially toroidal shape around said spool within said flanges to a height which maintains it within said flanges, a protective sleeve, the wall of said sleeve including a thin durable outer layer of relatively hard and tough paper and a thin layer of relatively soft compressible vulcanized fiber, said layers being several thousandths of an inch in thickness and said inner layer being thicker than said outer layer, said spool being inserted within said sleeve, the outside diameter of said flange being substantially larger than the relaxed inside diameter of said sleeve to provide a substantially permanent interference-fit relationship between said flanges and said sleeve, and the composite structure of said wall providing sufficient yielding compression about said flanges when they are inserted within said spool in said substantial interference-fit relationship to provide a remarkably rigid permanent and shock-resistant sealed assembly.

2. An encased magnetic core as set forth in claim 1 wherein said paper outer layer is plasticized.

3. An encased magnetic core as set forth in claim 2 wherein said plasticized outer layer of paper is impregnated by a phenolic resin.

4. An encased magnetic core as set forth in claim 1 wherein said inner layer is approximately twice as thick as the outer layer.

References Cited in the file of this patent

UNITED STATES PATENTS

| | | |
|---|---|---|
| 2,082,546 | Machate et al. | June 1, 1937 |
| 2,869,089 | Hampel | Jan. 13, 1959 |

OTHER REFERENCES

"Performance-Guaranteed Tape Wound Cores," Magnetics Inc., catalog TWC–100A; March 1955, particularly pp. 3, 21 and 28.